J. HOBART.

Boot and Shoe.

No. 9,623. Reissued March 29, 1881.

Witnesses
Geo. H. Strong.
Frank A. Brooks

Inventor
Joseph Hobart
By Dewey & Co.
Attys

N. PETERS, PHOTO-LITHOGRAPHER, WASHINGTON, D. C.

UNITED STATES PATENT OFFICE.

JOSEPH HOBART, OF NORDHOFF, CALIFORNIA.

BOOT AND SHOE.

SPECIFICATION forming part of Reissued Letters Patent No. 9,623, dated March 29, 1881.

Original No. 215,059, dated May 6, 1879. Application for reissue filed February 10, 1881.

*To all whom it may concern:*

Be it known that I, JOSEPH HOBART, of Nordhoff, county of Ventura, and State of California, have invented an Improvement in the Manufacture of Boots and Shoes; and I hereby declare the following to be a full, clear, and exact description thereof.

My invention relates to an improvement in the manufacture of boots and shoes; and my improvements consist in securing the counter of the boot or shoe by means of rivets along its edges, so as to prevent its breaking down and losing its shape, as is more fully shown in the accompanying drawings, in which—

Figure 1:
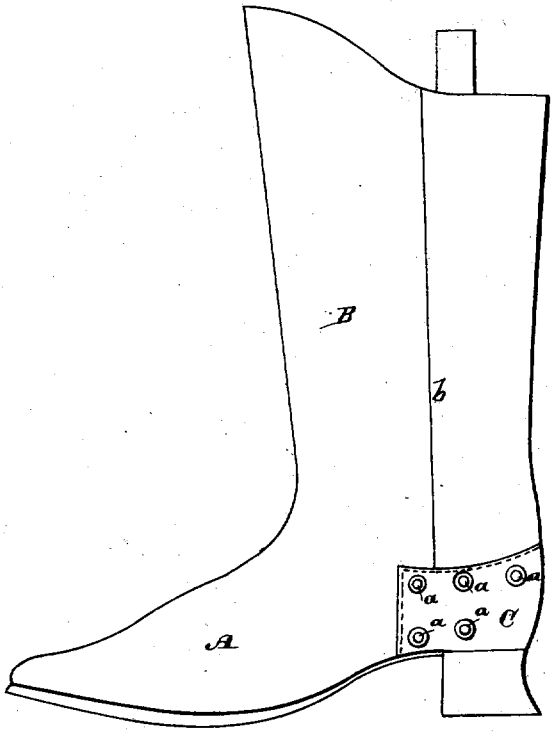
Figure 2:
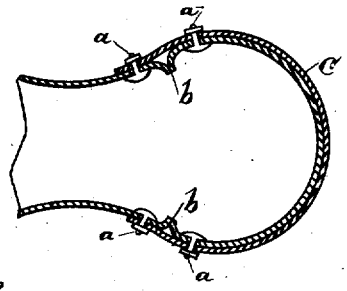

Figure 1 is a view of a boot with my device. Fig. 2 is a section of the same.

A represents the foot of a boot, B the leg, and C the counter. The counter, after being sewed on in the usual way, is still more firmly secured in place by the use of rivets *a*, the smooth heads of which are on the inside of the boot, the burrs being on the outside, or with tubular rivets the head is on the outside, the inside then being smooth. These rivets may be placed not only at the corners of the counter, but on the edges of the seams, they being more particularly useful in the center of the upper edge of the counter and at the upper corners. They serve to hold the counter firmly in place and prevent it curling or breaking down.

It is well known that in boots or shoes where the counters are sewed in the usual manner, when the boots get wet, and an attempt is made to put them on, the counters frequently break down and cause great inconvenience to the wearer. In fact, it is sometimes impossible to get the boot on again. This is particularly the case in coarsely-made boots, such as are used by farmers, miners, lumbermen, &c. By having the upper edge of the counter riveted to the leg of the boot or shoe the seam cannot be ripped or counter separated from the main leather by any undue strain being brought upon it, as in putting on wet boots. These rivets are equally applicable to either inside or outside counters, and are more particularly adapted for use in the coarsest classes of boots and shoes. The counter is by these rivets so firmly secured to the leg that breaking down of the counter is impossible, and by pulling on the leg, if the counter were bent, it would be straightened out so that the boot could be put on. In the drawings I have shown these rivets as applied to an outside counter.

It will be seen that the counter is continued past the vertical leg-seam, so as to cover said seam for the width of the counter. Stitching is then made down the sides of the leg-seam *b* through both leg and counter, and rivets are secured along the upper edge of the counter through each corner and on one or both sides of the vertical leg-seam. This construction prevents any ripping of the leg-seam at that point where it most frequently occurs, and also prevents any danger of leakage at that point, the seam being inside the counter. This method of applying the rivets and constructing the counter also better stiffens the heel of the boot, and as the rivet-heads are smooth and squeezed into the leather inside they present no obstruction to the heel of the person wearing the boot or shoe.

I am aware that it is not new to form the stiffening-piece so as to extend across the side seams of a boot or shoe, nor do I claim such, broadly, as my invention.

Having thus described my invention, what I claim as new, and desire to secure by Letters Patent, is—

As an improved manufacture, the boot A, having stiffening-piece C, extending across the side seams, and provided with rivets passing through the said piece and leather of the boot on each side of the seams, substantially as described.

In witness whereof I have hereunto set my hand.

JOSEPH HOBART.

Witnesses:
J. M. BROOKS,
OSVALDO DE LA SUENA.